US009977890B2

(12) United States Patent
Alberti et al.

(10) Patent No.: US 9,977,890 B2
(45) Date of Patent: May 22, 2018

(54) METHOD AND DEVICE FOR CONTROLLING ACCESS FROM THE DEVICE TO A CARD VIA A NFC INTERFACE

(71) Applicant: MOBEEWAVE, INC., Montreal (CA)

(72) Inventors: Xavier Alberti, Montreal (CA); Vincent Alimi, Verdun (CA); Maxime De Nanclas, Montreal (CA); Benjamin Du Hays, Hampstead (CA); Sebastien Fontaine, Montreal (CA)

(73) Assignee: MOBEEWAVE, INC., Montreal (CA)

( * ) Notice: Subject to any disclaimer, the term of this patent is extended or adjusted under 35 U.S.C. 154(b) by 0 days. days.

(21) Appl. No.: 15/503,743

(22) PCT Filed: Aug. 21, 2015

(86) PCT No.: PCT/CA2015/000472
§ 371 (c)(1),
(2) Date: Feb. 14, 2017

(87) PCT Pub. No.: WO2016/026025
PCT Pub. Date: Feb. 25, 2016

(65) Prior Publication Data
US 2017/0251369 A1 Aug. 31, 2017

Related U.S. Application Data

(60) Provisional application No. 62/040,632, filed on Aug. 22, 2014.

(51) Int. Cl.
*G06F 21/00* (2013.01)
*G06F 21/34* (2013.01)
(Continued)

(52) U.S. Cl.
CPC .............. *G06F 21/34* (2013.01); *G06F 21/35* (2013.01); *G06F 21/44* (2013.01); *G06F 21/445* (2013.01);
(Continued)

(58) Field of Classification Search
None
See application file for complete search history.

(56) References Cited

U.S. PATENT DOCUMENTS

2006/0288227 A1* 12/2006 Kalofonos .......... H04L 12/2803
713/182
2010/0323664 A1* 12/2010 Sivaram .................. H04M 1/66
455/411
(Continued)

FOREIGN PATENT DOCUMENTS

CA        2813365        11/2013
WO     2009156880 A1    12/2009
(Continued)

OTHER PUBLICATIONS
International Search Report from PCT/CA2015/000472, Paul Sabharwal, dated Nov. 16, 2015.
(Continued)

*Primary Examiner* — Hadi S Armouche
*Assistant Examiner* — Andrew J Steinle
(74) *Attorney, Agent, or Firm* — BCF LLP (57) ABSTRACT

The present relates to a method and device for controlling access from the device to a card via a Near Field Communication (NFC) interface of the device. An Access Control List (ACL) is stored at a memory of the device. The ACL comprises application signatures and corresponding card identifiers. A request is received at a processor of the device from a specific application executing on the device. The request is for accessing a particular NFC enabled card via the NFC interface of the device. The request comprises a particular card identifier of the particular card and a specific
(Continued)

signature of the specific application. A determination is made by the processor based on the specific signature, the particular card identifier and the ACL. The determination consists in whether the specific application is granted or alternatively denied access to the particular card via the NFC interface.

21 Claims, 5 Drawing Sheets

(51) Int. Cl.
    *G06F 21/44*     (2013.01)
    *G06F 21/35*     (2013.01)
    *H04W 12/08*     (2009.01)
    *H04L 29/06*     (2006.01)
    *H04W 4/00*     (2018.01)
    *G06K 19/04*     (2006.01)

(52) U.S. Cl.
    CPC .......... *H04L 63/101* (2013.01); *H04L 63/107* (2013.01); *H04W 4/008* (2013.01); *H04W 12/08* (2013.01); *G06K 19/042* (2013.01)

(56) References Cited

U.S. PATENT DOCUMENTS

2012/0329388 A1* 12/2012 Royston ................ H04W 4/008
                                                                             455/41.1
2014/0188713 A1* 7/2014 Alimi ................... G06Q 20/322
                                                                             705/39
2016/0261411 A1* 9/2016 Yau ....................... H04W 4/008

FOREIGN PATENT DOCUMENTS

WO       2013124689       8/2013
WO       2015028824 A1   3/2015

OTHER PUBLICATIONS

International Preliminary Report on Patentability from PCT/CA2015/000472 dated Dec. 6, 2016.

* cited by examiner

METHOD AND DEVICE FOR CONTROLLING ACCESS FROM THE DEVICE TO A CARD VIA A NFC INTERFACE

TECHNICAL FIELD

The present disclosure relates to the field of devices having a Near Field Communication (NFC) interface for accessing NFC enabled cards. More specifically, the present disclosure relates to a method and device for controlling access from the device to a NFC enabled card via a NFC interface of the device.

BACKGROUND

Various kind of devices, including mobile devices such as smartphones and tablets, are now equipped with a NFC interface. The NFC interface provides access to one or several types of NFC enabled cards, such as NFC enabled credit cards, NFC enabled transit payment cards, etc.

Since the card may contain critical information in terms of security (such as account numbers and related credentials in the context of NFC enabled credit cards), it is of great importance to prevent unauthorized access to the critical information stored on the card from the device via its NFC interface.

Several mechanisms have been implemented to control the access to the NFC enabled card. For example, in a device comprising a main Central Processing Unit (CPU), a Secure Element (SE) and a NFC Controller, the NFC Controller prevents direct access to the card from any application executed by the main CPU, while granting direct access to the card to all applications executed by the Secure Element (the applications executed by the Secure Element are certified and deemed to be secure). Some applications executed by the main CPU can gain an indirect access to the card via the Secure Element, by invoking dedicated Application Procedure Interfaces (APIs) of the Secure Element. For instance, a payment control application executed by the main CPU exchanges data with a NFC enabled credit card via APIs of the Secure Element, the Secure Element providing an indirect access to the credit card via the NFC controller. The determination of which applications executed by the main CPU can access the APIs of the Secure Element is commonly made at the main CPU level, which is not sufficiently secure. An application accessing the APIs of the Secure Element, such as a payment control application is usually certified, and developing such an application requires knowledge of the APIs of the Secure Element. However, nothing prevents someone from developing a rogue application that mimics the behavior of a certified payment control application to gain access to critical information of a credit card via the APIs of the Secure Element. In another scenario, a rogue application may be installed on the Secure Element for the same malicious purposes. The latter scenario requires a breach of the security infrastructure associated to the Secure Element, which is challenging, but not impossible.

The aforementioned security mechanisms for controlling the access to a NFC enabled card lack in granularity and security, since they do not provide the capability to securely filter the access on a per application basis. There is therefore a need for a new method and device for controlling access from the device to a NFC enabled card via a NFC interface of the device.

SUMMARY

According to a first aspect, the present disclosure relates to a method for controlling access from a device to a card via a NFC interface. The method comprises storing at a memory of the device an Access Control List (ACL). The ACL comprises application signatures and corresponding card identifiers. The method also comprises receiving, at a processor of the device, a request from a specific application executing on the device for accessing a particular NFC enabled card via the NFC interface of the device. The request includes a particular card identifier of the particular card and a specific signature of the specific application. The method further comprises determining by the processor based on the specific signature, the particular card identifier and the ACL, if the specific application is granted access to the particular card via the NFC interface or alternatively if the specific application is denied access to the particular card via the NFC interface.

According to a second aspect, the present disclosure relates to a device capable of controlling access from the device to a card via a NFC interface. The device comprises a NFC interface including a Contactless Front End (CLF) for exchanging data between the device and a NFC enabled card. The device also comprises a memory for storing an ACL. The ACL comprises application signatures and corresponding card identifiers. The device further comprises a processor for receiving a request from a specific application executing on the device for accessing a particular NFC enabled card via the NFC interface. The request includes a particular card identifier of the particular card and a specific signature of the specific application. The processor also determines based on the specific signature, the particular card identifier and the ACL, if the specific application is granted access to the particular card via the NFC interface or alternatively if the specific application is denied access to the particular card via the NFC interface.

According to a third aspect, the present disclosure relates to computer program product deliverable via an electronically-readable media such as storage media and communication links, the computer program product comprising instructions which when executed by a processor of a device provide for controlling access from the device to a card via a Near Field Communication interface by implementing the aforementioned method.

BRIEF DESCRIPTION OF THE DRAWINGS

Embodiments of the disclosure will be described by way of examples only, with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to controlling access from a device having a NFC interface to a NFC enabled card The following terminology is used throughout the present disclosure, and is meant to be interpreted as follows:

NFC interface: a communication interface comprising a NFC Contactless Front End (CLF) and a NFC antenna. The NFC CLF is also referred to as an NFC controller.

Secure element: a processing entity characterized by specific hardware and/or software components subject to a certification ensuring a specific level of security according to specific security standards. From a hardware perspective, a secure element includes usual components found in a computing entity: at least one microcontroller (e.g. Central Processing Unit (CPU)), memory (e.g. Random Access Memory (RAM) or FLASH memory), communication interfaces, etc. Specific hardware components may also be included to implement specific functionalities particular to a secure element. For instance, a cryptographic accelerator may be included. Also, a module providing Radio Frequency (RF) and electrostatic insulation may be included, to protect the secure element from eavesdropping. In the context of financial transactions, the certification of the secure element ensures that various financial entities are willing to use the secure element to store and process critical financial data, and to perform secured financial transactions using the critical financial data.

Application/applet: the term applet usually refers to a particular type of application executed by a particular type of operating system (OS). For example the OS of a Secure Element generally consists in Java Card® from Oracle Inc., and executes applets. In the present disclosure, when the term application is used, it may encompass both applications and applets.

Reference is now made concurrently to FIGS. 1-4, which represent a method 400 and device 100 for controlling access from the device 100 to a NFC enabled card via a NFC interface of the device.

Figure 1:
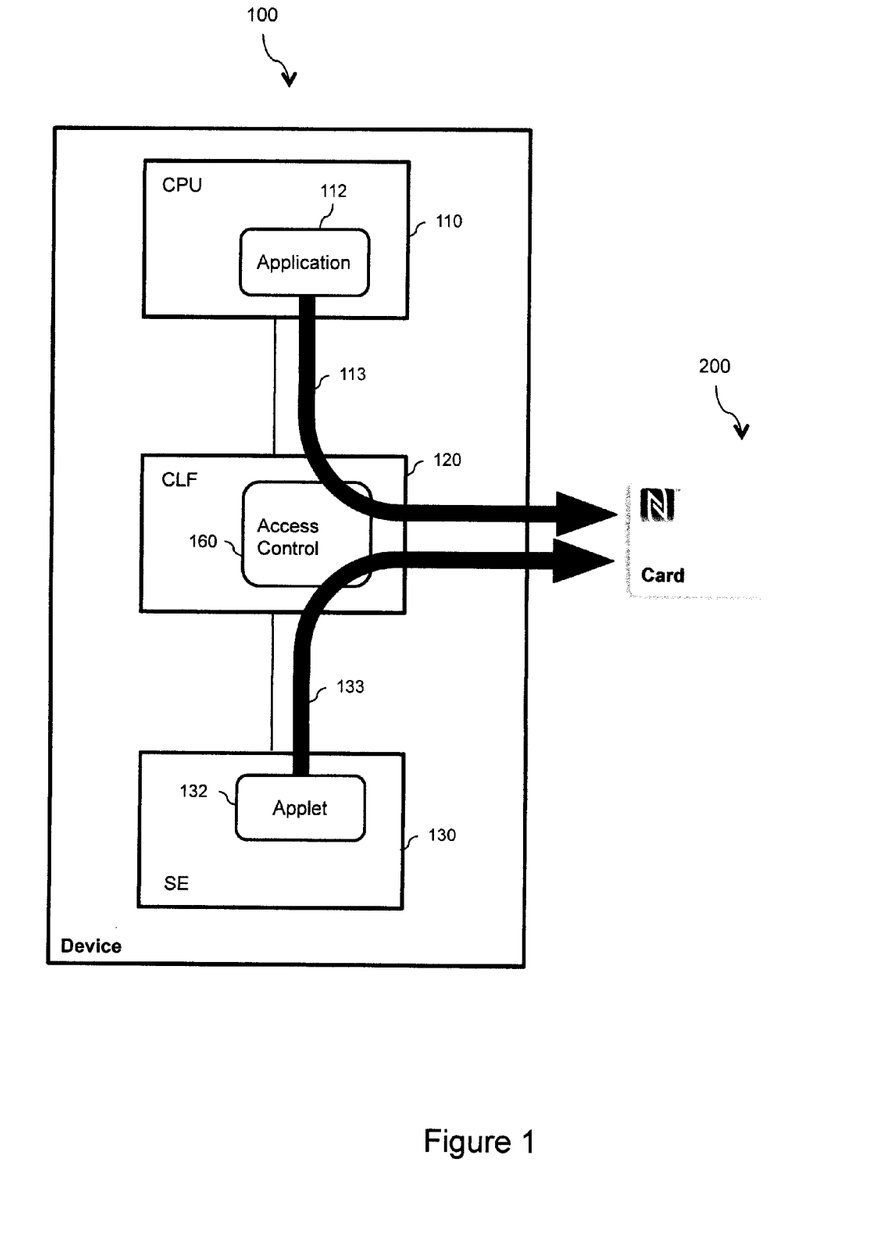
FIG. 1 illustrates a device implementing an access control for accessing a NFC enabled card via a NFC interface of the device, according to a first illustrative embodiment.
Figure 4:
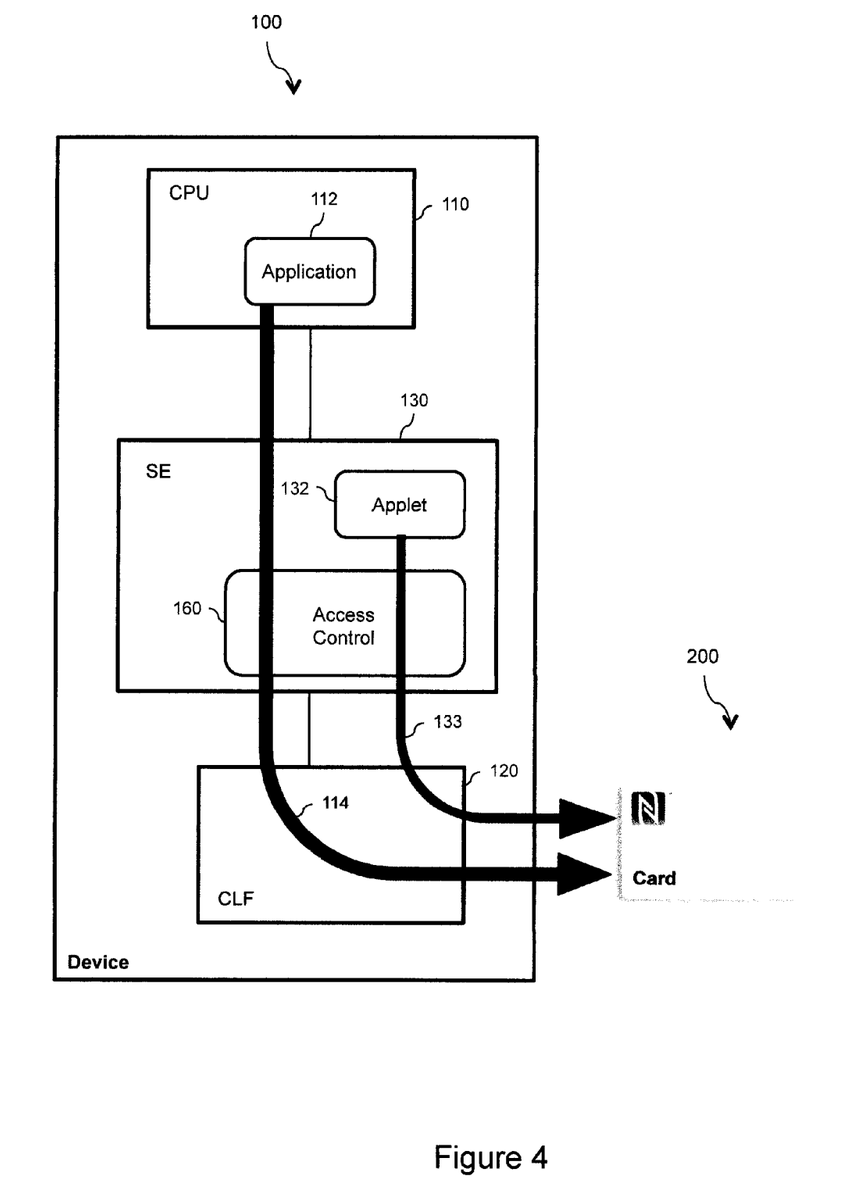
FIG. 4 illustrates a device implementing an access control for accessing a NFC enabled card via a NFC interface of the device, according to a second illustrative embodiment.

The device 100 represented in FIGS. 1 and 4 may consist of a mobile computing device such as a smartphone, a tablet, a laptop, a dedicated mobile payment terminal, etc. The device 100 may also consist of a fixed computing device such as a desktop, a dedicated fixed payment terminal, etc. A dedicated payment terminal is a device with a single (or at least main) functionality of providing payment acceptance capabilities; by opposition to a general purpose device, which may have payment acceptance capabilities among other functionalities.

The device 100 comprises a CPU 110, also referred to in the art as the main CPU or the host CPU of the device 100. The CPU 110 may have one or more processors (not represented in FIGS. 1 and 4) capable of executing instructions of an application 112. Each processor may further have one or several cores. The computing device 100 also comprises memory (not represented in FIGS. 1 and 4 for simplification purposes) storing instructions of the application 112, data generated by the execution of the application 112, etc. The device 100 may comprise several types of memories, including volatile memory (such as a volatile Random Access Memory (RAM)) and non-volatile memory (such as a hard drive).

The device 100 comprises a NFC interface for exchanging data with a NFC enabled card 200. Only the CLF 120 of the NFC interface has been represented in FIGS. 1 and 4 for simplification purposes. The CLF 120 comprises at least one processor and memory, not represented in FIGS. 1 and 4 for simplification purposes.

The device 100 may also comprise other communication interfaces (not represented in FIGS. 1 and 4 for simplification purposes). For instance, a mobile computing device 100 may comprise a cellular interface, a WI-FI® interface, etc. A fixed computing device 100 may comprise a WI-FI® interface, an Ethernet interface, etc.

The device 100 comprises a Secure Element 130, which comprises at least one processor and memory, not represented in FIGS. 1 and 4 for simplification purposes. The processor is capable of executing instructions of an applet 132 and the memory stores instructions of the applet 132, data generated by the execution of the applet 132, etc.

For illustration purposes only, when the device 100 implements a payment terminal functionality, an application 112 executed by the CPU 110 may consist of a payment control application and an applet 132 executed by the Secure Element 130 may consist of a payment acceptance applet. In this context, the card 200 may consist of a NFC enabled credit card.

When the device 100 is a general purpose mobile computing device such as a tablet or a smartphone, the CPU 110 executes an OS such as Android OS®, iOS®, etc. A plurality of applications 112 can be executed on top of such an OS, including web browsers, multimedia applications, social media applications, gaming applications, professional applications, etc.

The card 200 may consist of one of a variety of NFC enabled types of cards, including without restrictions: a NFC enabled credit card, a NFC enabled transit payment card (e.g. bus or train payment card, etc.), a NFC enabled facility access card (e.g. access card to access a private building, an office, a factory, etc.), a NFC enabled identity document (e.g. a passport), a Radio-Frequency Identification (RFID) tag, etc.

An applet 132 executed by the Secure Element 130 can interact 133 and exchange data with the card 200 via the CLF 120. An application 112 executed by the CPU 110 can interact 113 and exchange data with the card 200 directly via the CLF 120, as illustrated in FIG. 1. Alternatively, an application 112 executed by the CPU 110 can interact 114 and exchange data with the card 200 indirectly via the Secure Element 130 (which provides access to the CLF 120), as illustrated in FIG. 4.

Figure 3:
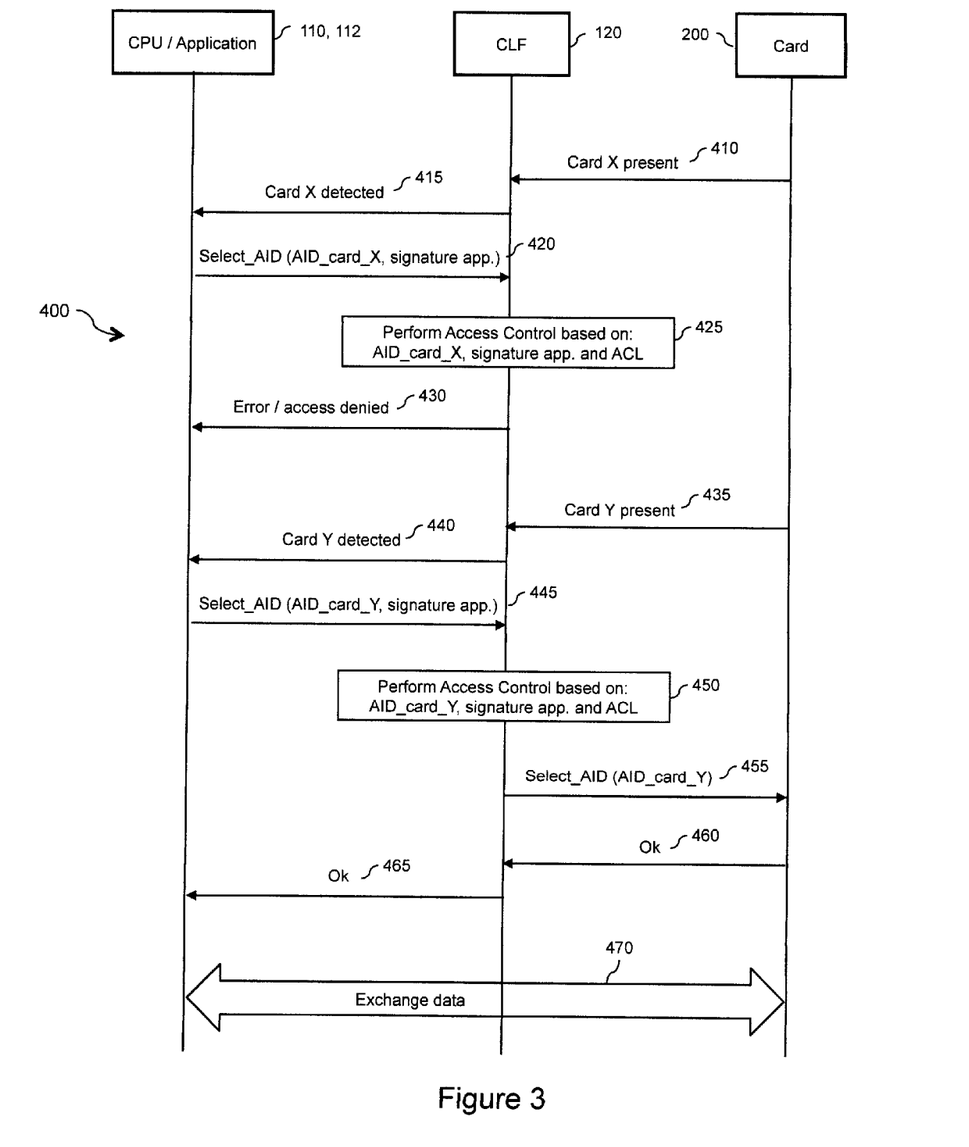
FIG. 3 illustrates an exemplary flow diagram of a method for controlling access from a device having a NFC interface to a NFC enabled card.

FIGS. 1 and 4 illustrate two different architectures of a device 100 embedding a Secure Element 130 and a CLF 120. In the CLF centric architecture represented in FIG. 1, applications 112 executed by the CPU 110 can directly access the card 200 through the CLF 120. In the SE centric architecture represented in FIG. 4, applications 112 executed by the CPU 110 cannot directly access the card 200 through the CLF 120, but use APIs provided by the Secure Element 130 to gain access to the card 200 through the CLF 120. The present disclosure provides an access control method 400 supporting both architectures. An exemplary flow diagram of the method 400 is illustrated in FIG. 3 and will be detailed later in the description.

The device 100 implements the method 400 for controlling access from the device 100 to the card 200 via the NFC interface of the device 100, by means of an access control functionality 160.

The method 400 comprises the step of storing at a memory 140 of the device 100 an Access Control List (ACL) 300 comprising application signatures 310 and corresponding card identifiers 320.

The method 400 comprises the step of receiving at a processor 150 of the device 100 a request from a specific application executing on the device 100 for accessing a particular Near Field Communication (NFC) enabled card 200 via the NFC interface of the device 100. The request comprises a particular card identifier of the particular card 200 and a specific signature of the specific application.

The method 400 comprises the step of determining by the processor 150 based on the specific signature, the particular card identifier and the ACL 300, if the specific application is granted access to the particular card 200 via the NFC interface of the device 100, or alternatively if the specific application is denied access to the particular card 200 via the NFC interface of the device 100.

The method 400 further comprises the step of configuring the device 100 to grant or alternatively deny access of the specific application to the particular card 200 via the NFC interface of the device 100, based on the determination made by the processor. The configuration is dependent on the particular hardware and software architecture of the device 100. It may consist in updating a routing table on at least one of the Secure Element 130 or the CLF 120. If the specific application is granted access, the routing table is updated accordingly to authorize the application to exchange data with the card 100. If the specific application is denied access, the routing table is not updated and by default the application is not authorized to exchange data with the card 100.

As illustrated previously, the specific application may be an application 112 executed by the CPU 110 or an applet 132 executed by the Secure Element 130. Thus, in various embodiments of the present method 400 and device 100, access control may be provided only for applications 112 executed by the CPU 110, only for applets 132 executed by the Secure Element 130, or for both applications 112 executed by the CPU 110 and applets 132 executed by the Secure Element 130.

The access control functionality 160 comprises a control software 162 executed by the processor 150 and the ACL 300 stored in the memory 140. The localization of the processor 150 and memory 140 in the device 100 depends on the particular architecture of the device 100, as will be detailed later in the description. The control software 162 may be integrated in an OS executing on the processor 150 or may be executing as an application on top of the OS.

The control software 162 receives the request from the specific application (e.g. 112 or 132) for accessing the particular card 200 and determines if the specific application (e.g. 112 or 132) is granted or denied access to the particular card 200. The determination is made by looking up the ACL 300 to find the specific signature among the list of application signatures 310 and further looking up the ACL to find the particular card identifier among the list card identifiers 320.

The ACL 300 may be implemented as a white list. If a specific application signature is not present in the list of application signatures 310, the corresponding application cannot access any card 200. If a specific application signature is present in the list of application signatures 310, the list of card identifiers 320 comprise all the particular card identifiers corresponding to the specific application signature and identifying the particulars cards 300 which can be accessed by the specific application. In the example illustrated in FIG. 2, a first application (executed by the CPU 110) having the signature App_sign_1 can only access a card 200 having the identifier Card_AID_X. A second application (executed by the CPU 110) having the signature App_sign_2 can only access a card 200 having the identifiers Card_AID_X or Card_AID_Y. A first applet (executed by the Secure Element 130) having the signature Applet_sign_1 can only access a card 200 having the identifier Card_AID_X. A second applet (executed by the Secure Element 130) having the signature Applet_sign_2 can only access a card 200 having the identifier Card_AID_Z. The implementation of the ACL 300 as a white list is preferable for devices 100 where most applications are not granted access to cards 200, such as general purpose tablets or smartphones.

Alternatively, the ACL 300 is implemented as a black list. If a specific application signature is not present in the list of application signatures 310, the corresponding application can access any card 200. If a specific application signature is present in the list of application signatures 310, the list of card identifiers 320 comprise all the particular card identifiers corresponding to the specific application signature and identifying the particulars cards 300 which cannot be accessed by the specific application.

The access control functionality 160 may also comprise an update software 164 executed by the processor 150. The update software 164 receives via a communication interface of the device 100 (e.g. a cellular interface, a WI-FI® interface, etc.) an update of the ACL 300, and updates the ACL 300 stored in the memory 140 with the received update. The update may be transferred (in a push or pull mode) from a centralized Trusted Service Manager (TSM) to the device 100 though a proper security infrastructure providing encryption of the transferred ACL update. The use of a TSM is particularly relevant in the case where the ACL 300 is stored on a memory 140 of the Secure Element 130, as will be detailed later in the description.

The specific signature of the specific application 112 or 132 uniquely identifies this specific application with respect to other applications which can be executed respectively by the CPU 110 and the Secure Element 130. The specific signature may consist of a hash generated by signing the binary code of the specific application with a certificate. Other methods known in the art for generating a unique signature of an application can be used alternatively. The specific infrastructure for generating and managing the signatures of the applications is out of the scope of the present disclosure, but may be implemented through a TSM or a system providing functionalities similar to a TSM.

The particular identifier of the particular card 200 uniquely identifies this particular card with respect to other types of cards which can be accessed via the NFC interface of the device 100. The particular identifier may consist of an AID according to the ISO/IEC 7816 standard. The AID comprises a header, the Registered application provider IDentifier (RID), with a particular value for each emitter of payment card, such as MasterCard®, Visa®, American Express®, etc. The AID further comprises the Proprietary application Identifier eXtension (PIX), which is specific to each emitter. The PIX determines a particular type of payment application, such as credit, debit, etc. Thus, the ACL 300 may implement different levels of granularity, for instance allowing or denying access to specific emitters of payment cards (e.g. MasterCard® only) based on the RID of the AID, or alternatively allowing or denying access to particular types of payment cards from a specific emitter (e.g. MasterCard® credit cards only) based on a combination of the RID and PIX of the AID. Other types of identifiers can be used for other types of cards which do not support the AID scheme defined by the ISO/IEC 7816 standard.

In a particular aspect corresponding to the CLF centric architecture represented in FIG. 1, the access control functionality 160 is provided by the CLF 120. Thus, the processor 150 and the memory 140 implementing the access control functionality 160 are embedded in the CLF 120.

In an alternative embodiment (not represented in FIG. 1), the processor 150 executing the control software 162 is embedded in the CLF 120, and the memory 140 storing the ACL 300 is embedded in the Secure Element 130. Thus, the access control functionality 160 is split between the CLF 120 and the Secure Element 130. Since the Secure Element 130 provides a higher level of security than the CLF 120, the ACL 300 is more securely stored in the memory 140 of the Secure Element 130. Additionally, the update software 164 is executed by a processor of the Secure Element 130 (and not the processor 150 of the CLF 120) for securely updating the ACL 300. Access to the ACL 300 stored in the memory 140 of the Secure Element 130 is strictly controlled and only granted to the control software 162 executed by the processor 150 of the CLF 120.

Even in the case where the processor 150 and the memory 140 implementing the access control functionality 160 are embedded in the CLF 120, the update software 164 may be executed by a processor of the Secure Element 130 (and not the processor 150 of the CLF 120) for securely updating the ACL 300 and benefiting from secure update capabilities generally provided by a Secure Element.

In another particular aspect corresponding to the SE centric architecture represented in FIG. 4, the access control functionality 160 is provided by the Secure Element 130. Thus, the processor 150 and the memory 140 implementing the access control functionality 160 are embedded in the Secure Element 130.

Now referring specifically to FIG. 3, an exemplary flow diagram illustrating the method 400 in the context of the CLF centric architecture of FIG. 1 is represented. For illustration purposes, the access control functionality 160 is integrally provided by the CLF 120. A similar flow diagram can be to the SE centric architecture of FIG. 4, by replacing the CLF 120 with the Secure Element 130.

Although FIG. 3 illustrates the method 400 in the context of an application 112 executed by the CPU 110, it can be generalized to an applet 132 executed by the Secure Element 130.

A first card 200 (card X) advertises 410 its presence to the CLF 120. The CLF reports 415 the detection of card X to the CPU 110. An application 112 executed by the CPU 110 requests 420 access to card X, providing its application signature and the AID of card X. The CLF 120 performs 425 the access control functionality 160 based on the ACL 300, the application signature and the AID of card X, and determines that the access to card X shall be denied for this application. The CLF 120 reports 430 the denial of access to the application 112.

A second card 200 (card Y) advertises 435 its presence to the CLF 120. The CLF reports 440 the detection of card Y to the CPU 110. An application 112 executed by the CPU 110 requests 445 access to card Y, providing its application signature and the AID of card Y. The CLF 120 performs 450 the access control functionality 160 based on the ACL 300, the application signature and the AID of card Y, and determines that the access to card Y shall be granted for this application. The CLF 120 requests 455 access to card Y, providing the AID of card Y. Card Y notifies 460 the CLF 120 that the access is granted, and the CLF 120 forwards 465 the notification to the application 112. Data can then be exchanged 470 between the application 112 and the card Y.

The present disclosure also relates to a computer program product deliverable via an electronically-readable media such as storage media and communication links. The computer program product comprises instructions which when executed by a processor of the device 100 implement the method 400 for controlling access from the device 100 to the card 200 via the NFC interface of the device 100.

In the case of the SE centric architecture illustrated in FIG. 4, the instructions for implementing the method 400 are executed by the processor 150 embedded in the Secure Element 130.

In the case of the CLF centric architecture illustrated in FIG. 1, the instructions for implementing the method 400 are executed by the processor 150 embedded in the CLF 120. Alternatively, the instructions for implementing the method 400 may be partially executed by the processor 150 embedded in the CLF 120 (control software 162) and partially executed by a processor of the Secure Element 130 (update software 164).

Figure 2:
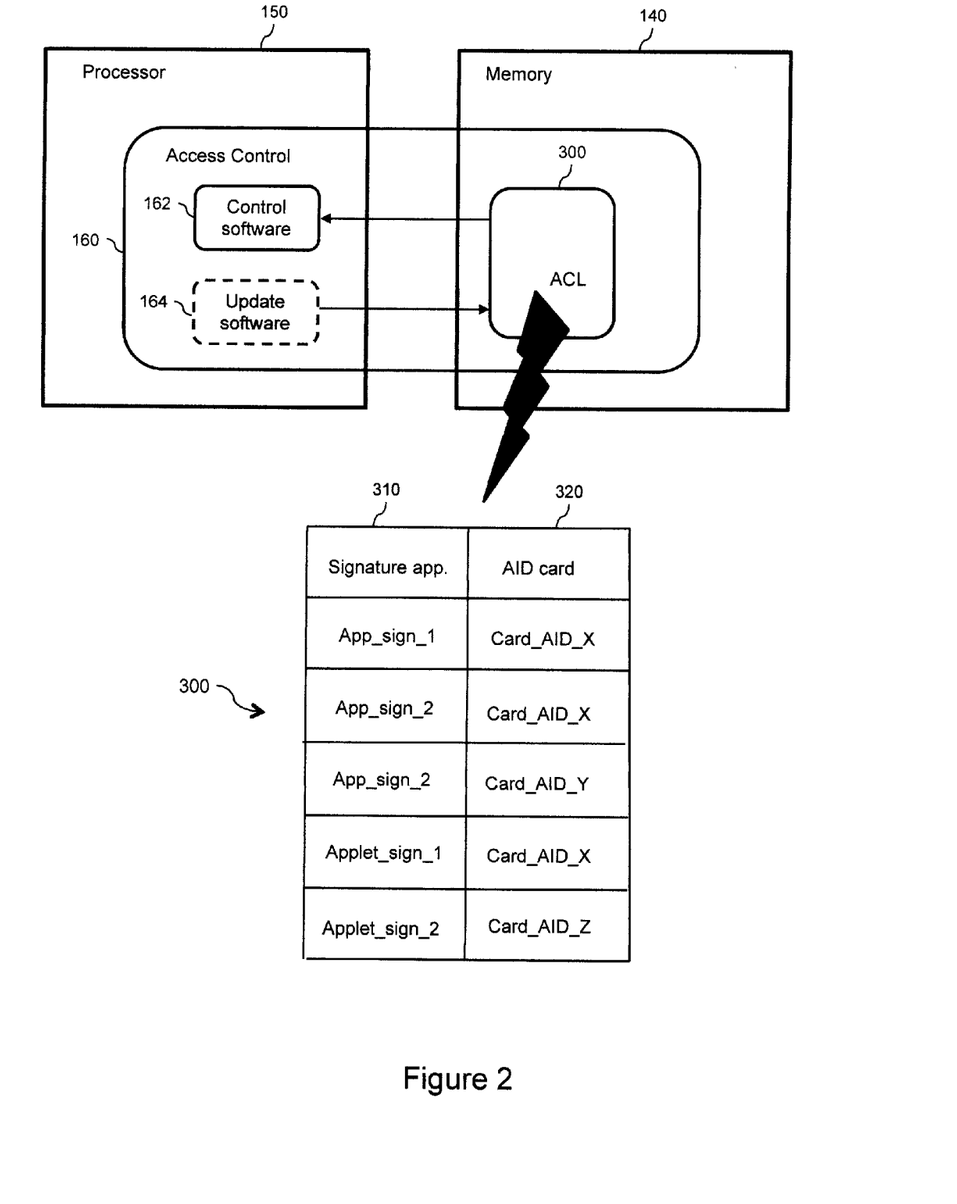
FIG. 2 illustrates an access control functionality and an Access Control List for the device of claim 1.
Figure 5:
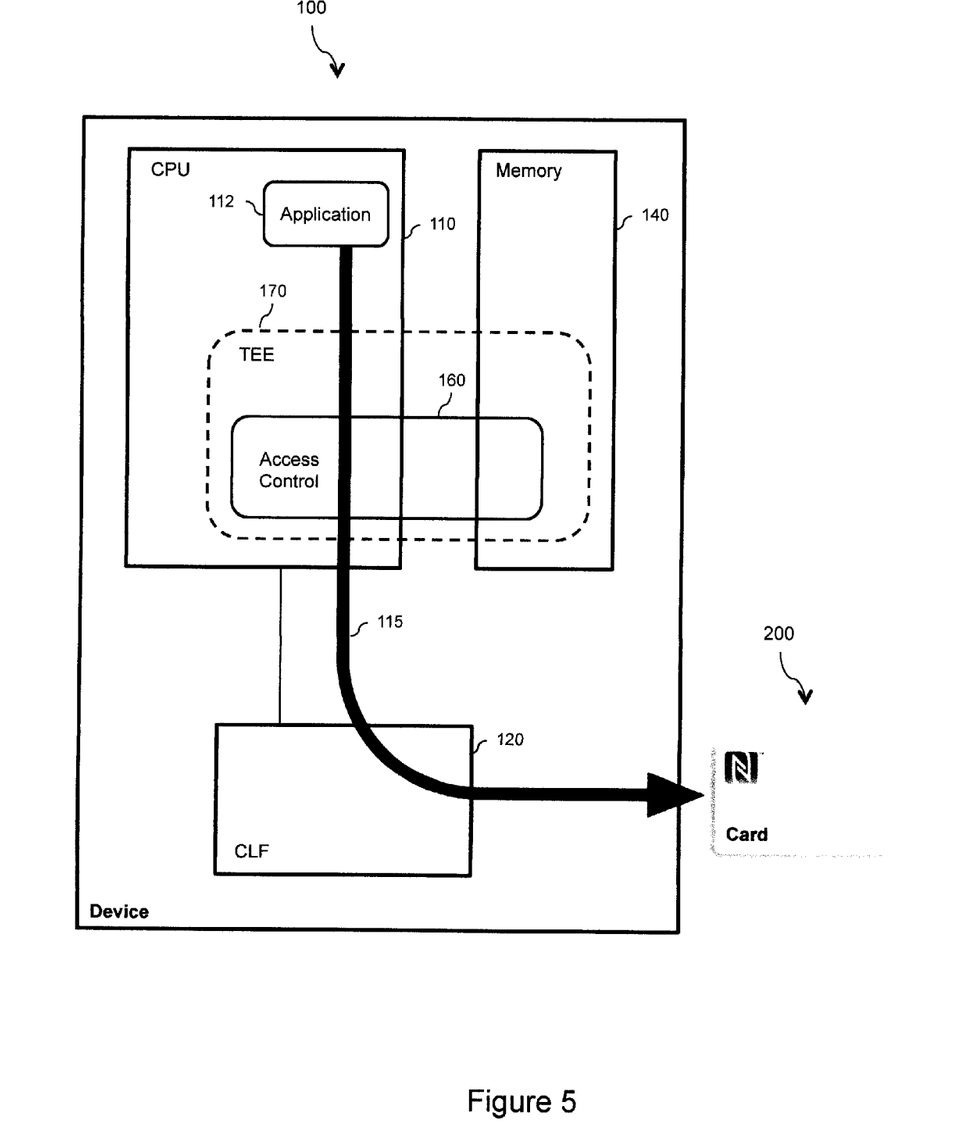
FIG. 5 illustrates a device implementing an access control for accessing a NFC enabled card via a NFC interface of the device, according to a third illustrative embodiment.

Referring now concurrently to FIGS. 2 and 5, another architecture of the device 100 is illustrated.

The device 100 does not include a Secure Element, but implements a Trusted Execution Environment (TEE) 170 instead. A TEE is well known in the art, and consists in a secure area that resides in the CPU 110 and general purpose memory 140 of the device 100. The TEE ensures that sensitive data are stored, processed and protected in a trusted environment. The TEE's ability to offer safe execution of authorized security software, known as 'trusted applications', enables it to provide end-to-end security by enforcing protection, confidentiality, integrity and data access rights. The TEE 170 may be implemented by a combination of hardware and software of the CPU 110, or alternatively by software only executed by a processor of the CPU 110.

The method 400 is performed within the TEE 170 of the device 100. The access control functionality 160 is implemented by a processor 150 (not represented in FIG. 5 for simplification purposes) embedded in the CPU 110 and the general purpose memory 140 of the device 100. The access control functionality 160 controls access 115 of the applications 112 executed by the CPU 110 to the card 200 via the NFC interface of the device 100. The control software 162 and the update software 164 are executed by the processor 150 within the TEE 170. The ACL 300 is stored in the memory 140 within the TEE 170.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for controlling access from a device to a card via a Near Field Communication (NFC) interface, the method comprising:
   storing at a memory of the device an Access Control List (ACL) comprising application signatures and corresponding card identifiers;
   receiving at a processor of the device a request from a specific application executing on the device for accessing a particular NFC-enabled card via the NFC interface of the device, the request comprising a particular card identifier of the particular NFC card and a specific signature of the specific application; and determining by the processor based on the specific signature, the particular card identifier and the ACL, if the specific application is granted access to the particular NFC card via the NFC interface or alternatively if the specific application is denied access to the particular NFC card via the NFC interface.

2. The method of claim 1, further comprising configuring the device to grant or alternatively deny access of the specific application to the particular NFC card via the NFC interface based on the determination by the processor.

3. The method of claim 1, wherein the processor is embedded in a Contactless Front End (CLF) of the NFC interface and the specific application is executed by one of the following: a Central Processing Unit (CPU) of the device or a Secure Element of the device.

4. The method of claim 3, wherein the memory is embedded in one of the following: the CLF or the Secure Element.

5. The method of claim 1, wherein the processor and the memory are embedded in a Secure Element of the device and the specific application is executed by one of the following: a CPU of the device or the Secure Element.

6. The method of claim 1, wherein the processor is embedded in a CPU of the device, receiving and determining by the processor are executed in a Trusted Execution Environment of the processor, the specific application is executed by the CPU, and the ACL is stored in a Trusted Execution Environment of the memory.

7. The method of claim 1, wherein the specific signature consists of a hash generated by signing the binary code of the specific application with a certificate.

8. The method of claim 1, wherein the particular NFC card is one of the following: a NFC enabled credit card, a NFC enabled transit payment card, a NFC enabled facility access card, a NFC enabled identity document, a Radio-Frequency Identification (RFID) tag.

9. The method of claim 1, further comprising receiving via a communication interface of the device an update of the ACL and updating the ACL stored in the memory with the received update.

10. A device comprising:
a Near Field Communication (NFC) interface including a Contactless Front End (CLF) for exchanging data between the device and a NFC enabled card;
a memory for storing an access control list (ACL) comprising application signatures and corresponding card identifiers; and
a processor for:
receiving a request from a specific application executing on the device for accessing a particular NFC enabled card via the NFC interface, the request comprising a particular card identifier of the particular NFC card and a specific signature of the specific application; and
determining based on the specific signature, the particular card identifier and the ACL, if the specific application is granted access to the particular NFC card via the NFC interface or alternatively if the specific application is denied access to the particular NFC card via the NFC interface.

11. The device of claim 10, wherein the processor further configures the device to grant or alternatively deny access of the specific application to the particular NFC card via the NFC interface based on the determination by the processor.

12. The device of claim 10 further comprising a Central Processing Unit (CPU) and a Secure Element, the processor being embedded in the CLF, the specific application being executed by one of the following: the CPU or the Secure Element.

13. The device of claim 12, wherein the memory is embedded in one of the following: the CLF or the Secure Element.

14. The device of claim 10 further comprising a CPU and a Secure Element, the processor and the memory being embedded in the Secure Element, the specific application being executed by one of the following: the CPU or the Secure Element.

15. The device of claim 10 further comprising a CPU, the processor being embedded in the CPU, receiving and determining by the processor being executed in a Trusted Execution Environment of the processor, the specific application being executed by the CPU, and the ACL being stored in a Trusted Execution Environment of the memory.

16. The device of claim 10, wherein the specific signature consists of a hash generated by signing the binary code of the specific application with a certificate.

17. The device of claim 10, wherein the particular NFC card is one of the following: a NFC enabled credit card, a NFC enabled transit payment card, a NFC enabled facility access card, a NFC enabled identity document, a Radio-Frequency Identification (RFID) tag.

18. The device of claim 10, further comprising a communication interface for receiving an update of the ACL, the ACL stored in the memory being updated with the received update.

19. A non-transitory computer program product deliverable via an electronically-readable media such as storage media and communication links, the computer program product comprising instructions which when executed by a processor of a device provide for controlling access from the device to a card via a Near Field Communication (NFC) interface by:
storing at a memory of the device an Access Control List (ACL) comprising application signatures and corresponding card identifiers;
receiving at a processor of the device a request from a specific application executing on the device for accessing a particular NFC enabled card via the NFC interface of the device, the request comprising a particular card identifier of the particular NFC card and a specific signature of the specific application; and
determining by the processor based on the specific signature, the particular card identifier and the ACL, if the specific application is granted access to the particular NFC card via the NFC interface or alternatively if the specific application is denied access to the particular NFC card via the NFC interface.

20. The non-transitory computer program product of claim 19, further comprising configuring the device to grant or alternatively deny access of the specific application to the particular NFC card via the NFC interface based on the determination by the processor.

21. The method of claim 1, further comprising, prior to the receiving at the processor of the device the request from the specific application executing on the device for accessing the particular NFC-enabled card via the NFC interface of the device:
receiving at the NFC interface of the device an indication of the particular NFC enabled card;
receiving at the processor of the device the indication of the particular NFC enabled card from the NFC interface of the device.

* * * * *